United States Patent
Ohno et al.

(10) Patent No.: US 8,743,777 B2
(45) Date of Patent: Jun. 3, 2014

(54) METHOD FOR CONTROLLING PATH SWITCHING IN WIRELESS COMMUNICATION SYSTEM, AND CONTROLLER AND WIRELESS BASE STATION IN THAT SYSTEM

(75) Inventors: Masashi Ohno, Kawasaki (JP); Masami Oshima, Kawasaki (JP); Hirotomo Yasuoka, Kawasaki (JP); Yasunari Izawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 477 days.

(21) Appl. No.: 12/640,857

(22) Filed: Dec. 17, 2009

(65) Prior Publication Data

US 2010/0091654 A1    Apr. 15, 2010

Related U.S. Application Data

(63) Continuation of application No. PCT/JP2007/063561, filed on Jul. 6, 2007.

(51) Int. Cl.
*H04W 4/00* (2009.01)
*H04J 3/16* (2006.01)

(52) U.S. Cl.
USPC ............................ 370/328; 370/331; 370/465

(58) Field of Classification Search
USPC .................................. 370/503, 328, 331, 465
See application file for complete search history.

(56) References Cited

U.S. PATENT DOCUMENTS

| 2002/0016178 | A1  |  2/2002 | Kito |
| 2002/0046277 | A1* |  4/2002 | Barna et al. .................... 709/224 |
| 2002/0181419 | A1* | 12/2002 | Zhang et al. ................... 370/331 |
| 2004/0027997 | A1* |  2/2004 | Terry et al. .................... 370/276 |
| 2005/0013265 | A1  |  1/2005 | Miyajima et al. |

(Continued)

FOREIGN PATENT DOCUMENTS

| EP | 1432262 A1 | 6/2004 |
| EP | 1758418 A1 | 2/2007 |
| JP | 10051836   | 2/1998 |

(Continued)

OTHER PUBLICATIONS

Japanese Notification of Reasons for Refusal dated Nov. 29, 2011 issued in application No. 2009-522430.

(Continued)

*Primary Examiner* — Andrew Lee
(74) *Attorney, Agent, or Firm* — Smith, Gambrell & Russell, LLP

(57) ABSTRACT

In a wireless communication system including a wireless terminal, a plurality of wireless base stations that wirelessly communicate with the wireless terminal, and a controller that changes the path used for communication with the wireless terminal from a first path via a first wireless base station to a second path via a second wireless base station, the controller monitors the amount of remaining data to the wireless terminal at the first wireless base station, controls to the timing to change to the second path according to the monitor result.

12 Claims, 12 Drawing Sheets

(56) References Cited

U.S. PATENT DOCUMENTS

| | | |
|---|---|---|
| 2005/0207374 A1 | 9/2005 | Petrovic et al. |
| 2006/0030323 A1* | 2/2006 | Ode et al. .................. 455/436 |
| 2007/0049345 A1 | 3/2007 | Sao et al. |
| 2007/0248051 A1* | 10/2007 | Nagaraj et al. ............ 370/331 |
| 2008/0085711 A1* | 4/2008 | Alberi-Morel et al. ...... 455/437 |
| 2009/0129275 A1 | 5/2009 | Watanabe et al. |
| 2009/0168724 A1* | 7/2009 | Umesh et al. .............. 370/331 |
| 2009/0279507 A1* | 11/2009 | Kanazawa et al. .......... 370/332 |
| 2011/0003556 A1* | 1/2011 | Voyer et al. ............... 455/67.11 |

FOREIGN PATENT DOCUMENTS

| | | |
|---|---|---|
| JP | 200243959 A | 2/2002 |
| JP | 200539522 A | 2/2005 |
| JP | 2005510950 | 4/2005 |
| JP | 2005521360 | 7/2005 |
| JP | 2005525057 | 8/2005 |
| JP | 2006245913 | 9/2006 |
| JP | 200789141 | 4/2007 |
| WO | 03047155 | 6/2003 |
| WO | 03088695 | 10/2003 |
| WO | 03096707 | 11/2003 |
| WO | 2004057887 | 7/2004 |
| WO | 2007030185 A2 | 3/2007 |
| WO | 2007069319 | 6/2007 |
| WO | 2007074511 | 7/2007 |

OTHER PUBLICATIONS

International Search Report dated Oct. 16, 2007.

3GPP TS 44.118 V7.1.0 (Jul. 2005) 3rd Generation Partnership Project; Technical Specification Group GSM/EDGE Radio Access Network; Mobile radio interface layer 3 specification; Radio Resource Control (RRC) protocol; Iu Mode (Release 7); Jul. 2005.

3GPP TR 25.877 V5.1.0 (Jun. 2002) 3rd Generation Partnership Project; Technical Specification Group Radio Access Network; High Speed Downlink Packet Access; Iub/Iur protocol aspects (Release 5); Jun. 2002.

3GPP TS 25.308 V7.1.0 (Dec. 2006) 3rd Generation Partnership Project; Technical Specification Group Radio Access Network; High Speed Downlink Packet Access (HSDPA); Overall description; Stage 2 (Release 7); Dec. 2006.

Extended European Search Report dated Mar. 21, 2012 in relation to EP Application No. 07768293.8 -2416 / 2166774.

* cited by examiner

FIG. 2

| INSTANCE ID | THE NUMBER OF REMAINING PDUs |
|---|---|
| INSTANCE ID (1) | THE NUMBER OF REMAINING PDUs (1) |
| INSTANCE ID (2) | THE NUMBER OF REMAINING PDUs (2) |
| ⋮ | |
| INSTANCE ID (N) | THE NUMBER OF REMAINING PDUs (M) |

FIG. 7

| Frame CRC | FT |
|---|---|
| Frame Type 0x0A ||
| Spare bit | CmCH-PI |
| User Buffer Size ||
| User Buffer Size (cont) ||
| Spare Extension ||

FIG. 8

| PARAMETER | LENGTH | RANGE |
|---|---|---|
| FT | 1bit | 0: DATA FRAME, 1: CONTROL FRAME |
| CmCH-PI | 4bits | DATA PRIORITY (LOWEST: 0 ··· 15: HIGHEST) |
| User Buffer Size | 16bits | DATA BUFFER AMOUNT WAITING FOR TRANSMISSION (0-65535 octs) |
| Spare Extension | 0~32octs | SPARE |

FIG. 9

| Frame CRC | FT |
|---|---|
| Frame Type 0x0B ||
| Spare bit | CmCH-PI |
| Max MAC-d PDU Length ||
| Max MAC-d PDU Length (cont) | Spare bits |
| HS-DSCH Credits ||
| HS-DSCH Interval ||
| HS-DSCH Repetition Period ||
| Spare Extension ||

FIG. 10

| PARAMETER | LENGTH | RANGE |
|---|---|---|
| FT | 1bit | 0: DATA FRAME, 1: CONTROL FRAME |
| CmCH-PI | 4bits | DATA PRIORITY (LOWEST: 0 ···· 15: HIGHEST) |
| Max MAC-d PDU Length | 13bits | DATA BUFFER AMOUNT WAITING FOR TRANSMISSION (0-65535 octs) |
| HS-DSCH Credits | 8bits | TRANSMISSION ALLOWABLE NUMBER OF MAC-d PDUs (0: TRANSMISSION SUSPENSION, 2047: UNLIMITED) |
| HS-DSCH Interval | 8bits | CREDITS VALID PERIOD (0-2550ms at ×10ms) DURING THIS INTERVAL, MAC-d PDU UP TO MAXIMUM NUMBER OF CREDITS CAN BE SENT IF INTERVAL=0, TRANSMISSION ALLOWABLE NUMBER OF MAC-d PDUs IS ZERO |
| HS-DSCH Repetition Period | 8bits | NUMBER OF CONTINUOUS CREDITS VALID PERIOD (0: UNLIMITED) TOTAL TRANSMISSION AVAILABLE TIME = INTERVAL × REPETITION PERIOD TOTAL NUMBER OF MAC-d PDUs THAT CAN BE TRANSMITTED = CREDITS × REPETITION PERIOD |
| Spare Extension | 0~32octs | SPARE |

METHOD FOR CONTROLLING PATH SWITCHING IN WIRELESS COMMUNICATION SYSTEM, AND CONTROLLER AND WIRELESS BASE STATION IN THAT SYSTEM

CROSS-REFERENCE TO RELATED APPLICATION

This application is a continuation Application of a PCT international application No. PCT/JP2007/063561 filed on Jul. 6, 2007 in Japan, the entire contents of which are incorporated by reference.

FIELD

The embodiments discussed herein are related to a method for controlling path switching in a wireless communication system, and to a controller and a wireless base station in that system.

BACKGROUND

In a wireless communication system having a wireless base station (BTS: Base Transceiver Station) that provides a wireless communication area (cell), a wireless terminal (MS: Mobile Station), and a radio network controller (RNC) that controls the BTS, the MS can communicate with other MSs via the BTS if the MS is within a range in which the MS can exchange radio waves with that BTS.

In such a wireless communication system, the MS generally measures the communication qualities of the communications with the BTS with which the MS is communicating and with other BTSs located close to the MS, and periodically or occasionally reports information on the communication quality to the RNC via the BTS. The RNS includes a function that controls cell (path) switching for switching from the BTS with which the MS is communicating to another BTS when the RNC detects that the communication quality with the BTS with which the MS is communicating drops to equal to or smaller than a predetermined threshold due to migration of the MS or the like, based on the report (communication quality information) from the MS.

In the meantime, in the High Speed Downlink Packet Access (HSDPA) that is one of wireless communication techniques, a single shared resource is dynamically time-division multiplexed and code multiplexed, and allocated to a plurality of MSs for the purpose of increasing the peak speed and reducing transmission delay in the downlink (here, the communication direction from a BTS to an MS). In addition, in order to improve the transmission efficiency, techniques, such as the adaptive modulation and coding (AMC) or the hybrid automatic repeat request (HARQ), are applied.

In addition, in the HSDPA, a High Speed Downlink Shared Channel (HS-DSCH) is used as a transport channel that terminates at a BTS. It is noted that this channel is applied in a Packet Switch (PS) domain.

During an HSDPA communication, in order to share one channel among multiple users, and to avoid congestion and buffer overflow on an MS side, a flow control is performed between Iur and Iub. Here, "Iur" is an interface used between RNCs, and "Iub" is an interface used between an RNC and a BTS. It is noted that such a flow control is performed using the High Speed Downlink Shared Channel Frame Protocol (HS-DSCH FP) which is a control frame on the user plane (U-plane).

One example of the entire operations in a wireless communication system to which the above-described HSDPA is applied will be described with reference to FIG. 6 to FIG. 10. FIG. 6 is a sequence diagram illustrating the communication operation between an RNC and a BTS in a wireless communication system to which the above HSDPA is applied. In addition, FIG. 7 is a diagram illustrating a frame format of a capacity request signal, and FIG. 8 is a diagram illustrating setting values of a capacity request signal. Furthermore, FIG. 9 is a diagram illustrating a frame format of a capacity allocation signal, and FIG. 10 is a diagram illustrating setting values of a capacity allocation signal. It is noted that a capacity request signal is a control signal for requesting the transmission rate of data sent from an RNC to a BTS. In addition, a capacity allocation signal is a response signal for the capacity request signal, and a control signal used by the BTS to inform the RNC of the transmission rate.

As depicted in FIG. 7 and FIG. 8, the frame format of a capacity request signal is configured to include a Frame CRC field that indicates a CRC of the frame, an FT field that indicates whether the frame is a data frame or a control frame, a Frame Type field that indicates the frame type of the frame (for example, "0x0A"), a Spare bit that is used as a spare, a CmCH-PI field that indicates a priority of the user data, a User Buffer Size field that indicates the amount of data buffer waiting for transmission of user data, and a Spare Extension field that is a spare.

In addition, as depicted in FIG. 9 and FIG. 10, the frame format of a capacity allocation signal is configured to include a Frame CRC field that indicates a CRC of the frame, an FT field that indicates whether the frame is a data frame or a control frame, a Frame Type field that indicates the frame type of the frame (for example, "0x0B"), a Spare bit that is used as a spare, a CmCH-PI field that indicates a priority of the user data, a User Buffer Size field that indicates the amount of data buffer waiting for transmission of user data, a Max MAC-d PDU Length field that indicates the maximum MAC-d PDU length that can be sent, an HS-DSCH Credits field that indicates the allowable MAC-d PDU number sent by the RNC, an HS-DSCH Interval field that indicates a valid interval (period) of the above HS-DSCH credit, an HS-DSCH Repetition Period field that indicates continuous valid interval of the above HS-DSCH credit, and a Spare Extension field that is a spare.

In a wireless communication system to which the HSDPA is applied, the flow control as depicted in FIG. 6 is performed using a capacity request signal and capacity allocation signal described above. FIG. 6 is a sequence diagram illustrating the communication operation between an RNC 100 and a BTS 200 in a wireless communication system to which the above HSDPA is applied. It is noted that a definition of an HS-DSCH FP is standardized in order to archive a flow control between the RNC 100 and the BTS 200.

In this flow control, firstly, the RNC 100 as the transmission side determines that user data transmission rate (hereinafter, sometimes simply referred to as "transmission rate") to the BTS 200 is 0 kbps, and that there is user data to be transmitted for a predetermined time period, the RNC 100 sends a capacity request signal (FT=1, CmCH-PI=N (the range of N is between 0 and 15), and the user buffer size=U>0) to the BTS 200 as the reception side (see (1) in FIG. 6).

In response to receiving the above capacity request signal from the RNC 100, the BTS 200 sends a capacity allocation signal (FT=1, CmCH-PI=N, the PDU length (>0), credit (>0), and the interval (>0)) for specifying the transmission rate at the RNC 100 to the RNC 100(see (2) in FIG. 6). Here, the transmission rate is set to "transmission rate: high," for example.

Next, in response to receiving the above capacity allocation signal, the RNC 100 sends user data (HS-DSCH data frame) at the transmission rate specified by the BTS 200 ("transmission rate: high") to the BTS 200 (see (3) in FIG. 6). It is noted that the particular queue to send the capacity request signal and the capacity allocation signal described above is not stipulated, and is set by the user to any appropriate timing. For example, when the transmission rate is needed to be changed due to some reason, such as an increase or decrease the number of users communicating on the same channel, for example, the BTS 200 may autonomously specify the transmission rate based on capacity allocation signal to change the transmission rate without receiving a queue from the transmission side (capacity request signal) (see (4) and (5) in FIG. 6, for example). Similar to this, the RNC 100 may also autonomously determine the transmission rate without complying with the transmission rate specified by the BTS 200 side (capacity allocation signal).

Thus, the flow control as described above is adapted to control the transmission rate efficiently where a bottle neck is located on a transmission path between the RNC 100 and the BTS 200, for example.

Next, cell switching control in the above-described wireless communication system will be explained with reference to FIG. 11 and FIG. 12. FIG. 11 is a schematic diagram illustrating cell switching control in the wireless communication system, and FIG. 12 is a sequence diagram pertaining to the cell switching control.

As depicted in (1) in FIG. 11, for example, it is assumed that an MS 300 is carrying out wireless communication with a BTS 200-1 in the cell of the BTS 200-1 (the solid black area in (1) in FIG. 11). At this time, the MS 300 periodically or occasionally measures the communication quality with the BTS 200-1 and the communication quality with another BTS 200-2 that is present in the proximity to the MS 300, and reports measurement results of those communication qualities to the RNC 100 via the BTS 200-1 (200-2). It is noted that the measurement processing is performed using a control plane (C-plane) depicted with a dotted line allow in FIG. 11, and communication of user data is performed using the user plane (U-plane) depicted with a solid line allow in FIG. 11.

The RNC 100 determines whether or not there is any other cell that has a better communication quality than the current cell based on the above report (communication quality measurement result) from the MS 300.

At this time, when the RNC 100 determines that a better communication quality is obtained if the cell of the BTS 200-2 is used than when using the cell of the BTS 200-1 as for data communication with the MS 300, for example, switch cell (path) change (cell switching control) to change the cell with which the MS 300 communicates to the cell of the BTS 200-2 is performed to change from the communication state depicted in (1) in FIG. 11 to the communication state depicted in (2) in FIG. 11 (the black solid area in (2) in FIG. 11).

Here, the cell switching control as described above will be further explained with reference to the sequence diagram in FIG. 12. Similar to the example depicted in FIG. 11, the example depicted in FIG. 12 also illustrates the case in which the RNC 100 performs cell switching control from the cell of the BTS 200-1 to the cell of another BTS 200-2.

Firstly, the MS 300 measures the communication quality at the cell of the BTS 200-1 with which the MS 300 is communicating and communication at the cell of another BTS 200-2, and sends the measurement results to the RNC 100 as wireless communication qualities (event ID: 1D).

The RNC 100 determines whether or not to perform cell switching control based on the wireless communication qualities received from the MS 300. In the example depicted in FIG. 12, for the data communication with the MS 300, it is determined that a better communication quality is obtained if the cell of the BTS 200-2 is used than when the cell of the BTS 200-1 is used, the RNC 100 determines whether or not cell switching control is performed to switch the cell to communicate with the MS 300 from the cell of the BTS 200-1 (cell change origin) to the cell of the BTS 200-2 (cell change destination) (see "commence cell change").

Next, when determining to perform cell switching control, the RNC 100 sends an RL reconfiguration preparation message (RL RECONF. PREPARE) to the BTS 200-2 for preparing a Radio Link (RL) configuration of the cell change destination BTS 200-2. In response to receiving this, the BTS 200-2 replies to the RNC 100 with an RL reconfiguration ready complete message (RL RECONF. READY) that is a reply therefor. In addition, the RNC 100 sends an establishment request message (ESTABLISH REQUEST) to the BTS 200-2. In response to receiving this, the BTS 200-2 replies to the RNC 100 with an establish confirm message (ESTABLISH CONFIRM) that is a reply therefor (see the processing depicted with the reference symbol (a)).

Furthermore, the RNC 100 sends an RL reconfiguration preparation message (RL RECONF. PREPARE) to the BTS 200-1 for preparing an RL configuration of the BTS 200-1. In response to receiving this, the BTS 200-1 replies to the RNC 100 with an RL reconfiguration ready complete message (RL RECONF. READY) that is a reply therefor (see the processing depicted with the reference symbol (b)).

At this time, the RNC 100 starts the timer (see "setting timer"), and sends an RL reconfiguration commit message (RL RECONF. COMMIT) and a physical channel reconfiguration message (PHY. CH. RECONF) to which the activation time is embedded to the BTS 200-1, the BTS 200-2, and the MS 300, respectively (see the processing depicted with the reference symbol (c)). At this time, the activation time is used as a timer value until carrying out an actual cell switching as described in Non-Patent Reference 1 that will be mentioned later, and when the above-described timer expires a timer value that is set to the activation time (hereinafter, may be simply referred to as "timer value"), cell switching control is performed by the RNC 100.

On the other hand, the BTS 200-1 sends a capacity allocation signal (transmission rate: 0 (credit=0 and interval=0)) to the RNC 100 which is a flow control signal for suspending transmission of downlink data (user data) from the RNC 100 (see the processing depicted with the reference symbol (d)).

In response to receiving the above capacity allocation signal from the BTS 200-1, the RNC 100 suspends transmission of user data to the BTS 200-1, and waits for carrying out of cell switching control until the above activation time comes. On the other hand, the BTS 200-1 continues to send user data remaining in the local station 200-1 to the MS 300 until the above timer value expires.

After the above timer value expires, the RNC 100 performed configuration of the intra-apparatus path (within the RNC 100, from the terminating apparatus to the BTS 200-2 to the terminating apparatus relating to the HSDPA communication) (see the processing depicted with the reference symbol (e)).

On the other hand, after the above timer value expires, the BTS 200-2 sends a capacity allocation signal (transmission rate: X (MAC-d, the PDU length, credit, and interval>0)) to the RNC 100 which is a flow control signal for resuming communication of downlink data (user data) from the RNC 100 (see the processing depicted with the reference symbol (f)).

In response, the RNC 100 detects completion of the above processing (see the processing depicted with the reference symbols (e) and (f)), receives an RL physical channel reconfiguration complete message (PHY. CH. RECONF. COMPLETE) indicating reconfiguration complete report from the MS 300 to resume downlink data transmission to the BTS 200-2, while exchanging a release request message (RELEASE REQUEST) and a release confirm message (RELEASE CONFIRM) with the BTS 200-1, and disconnecting the channel with the BTS 200-1 (see the processing depicted with the reference symbol (g)).

In other words, when determining to perform cell switching control based on the report on the wireless communication quality (1D) between the MS 300 and the BTS 200, the RNC 100 sets the activation time (timer value), and performs cell switching control from the BTS 200-1 (cell change origin) to the BTS 200-2 (cell change destination) after waiting for expiration of the timer value.

It is noted that the above-described cell switching control is disclosed in Non-Patent References 2 and 3 that will be listed below, and Patent References 1-4 listed below describe technique related to cell switching control methods in wireless communication systems containing an HSDPA.

The following Patent Reference 1 discloses determining whether or not any data is remained in an old node, and suspending data transmission from an RNC to old node based on the determination result. In addition, the following Patent Reference 2 discloses execution of a negotiation of the activation time. Furthermore, the following Patent References 3 and 4 disclose flow control signal processing between a serving RNC (S-RNC), a drift RNC (D-RNC), a node B, and a user equipment (UE) upon handover.

Patent Reference 1: Japanese Translation of PCT International Application No. 2005-510950
Patent Reference 2: International Patent Publication No. WO2004/057887
Patent Reference 3: Japanese Translation of PCT International Application No. 2005-525057
Patent Reference 4: Japanese Translation of PCT International Application No. 2005-521360
Non-Patent Reference 1: 3rd Generation Partnership Project; Technical Specification Group GSM/EDGE Radio Access Network; Mobile radio interface layer 3 specification; Radio Resource Control (RRC) protocol; Iu Mode (Release 7) (3GPP TS44.118 V7.1.0 (2005-07)
Non-Patent Reference 2: 3rd Generation Partnership Project; Technical Specification Group Radio Access Network; High Speed Downlink Packet Access; Iub/Iur protocol aspects (Release 5) (3GPP TR25.877 V5.1.0 (2002-06))
Non-Patent Reference 3: 3rd Generation Partnership Project; Technical Specification Group Radio Access Network; High Speed Downlink Packet Access (HSDPA); Overall description; Stage 2 (Release 7) (3GPP TS25.308 V7.1.0 (2006-12))

In the meantime, cell switching control is not performed until the timer value expires in the above-described cell switching control method.

However, by the time that the timer value expires, the BTS 200-1 that is the cell change origin may complete transmission of user data to the MS 300. Such a case may pose a problem in that, although there is not user data to be transmitted to the MS 300 left within the BTS 200-1, no cell switching control is performed until the timer value expires.

As a result, the communication efficiency of the wireless communication system may be deteriorated since there is time during which there is no user data to be transmitted from the BTS 200-1 to the MS 300 (no communication time).

In addition, due to change (deterioration) of the communication environment, the BTS 200-1 that is the cell change origin may not successfully complete transmission of user data to the MS 300 by the time that the timer value expires. Such a case may also pose a problem in the cell switching control is not performed until the timer value expires although the BTS 200-1 cannot successfully send user data to the MS 300. As a result, transmission delay of the user data may occur.

SUMMARY (1) According to an aspect of the embodiments, a method includes a method for controlling path switching in a wireless communication system including a wireless terminal; a plurality of wireless base stations that communicate with the wireless terminal; and a controller that changes a path used for communicating with the wireless terminal from a first path via a first wireless base station to a second path via a second wireless base station, the method including: on the controller, monitoring a remaining amount of data addressed to the wireless terminal in the first wireless base station; and controlling timing for changing to the second path according to a result of the monitoring.

(2) According to an aspect of the embodiments, an apparatus includes a controller in a wireless communication system including a wireless terminal; a plurality of wireless base stations that communicate with the wireless terminal; and a controller that changes a path used for communicating with the wireless terminal from a first path via a first wireless base station to a second path via a second wireless base station, the controller including: a monitoring unit that monitors a remaining amount of data addressed to the wireless terminal in the first wireless base station; and a controlling unit that controls timing for changing to the second path according to a result of the monitoring by the monitoring unit.

(3) According to an aspect of the embodiments, an apparatus includes a wireless base station in a wireless communication system including a wireless terminal; a plurality of wireless base stations that communicate with the wireless terminal; and a controller that changes a path used for communicating with the wireless terminal from a first path via a first wireless base station to a second path via a second wireless base station, the wireless base station including: a detecting unit that detects a remaining amount of data addressed to the wireless terminal within the wireless base station; and a notifying unit that notifies the controller of the remaining amount of the data detected by the detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 illustrates an example of the structure of a remaining PDU information table;

FIG. 7 is a diagram illustrating a frame format of a capacity request signal;

FIG. 8 is a diagram illustrating setting values of a capacity request signal;

FIG. 9 is a diagram illustrating a frame format of a capacity allocation signal;

FIG. 10 is a diagram illustrating setting values of a capacity allocation signal;

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

(A) Description of One Embodiment (Example of Configuration of Wireless Communication System 40)

Figure 1:
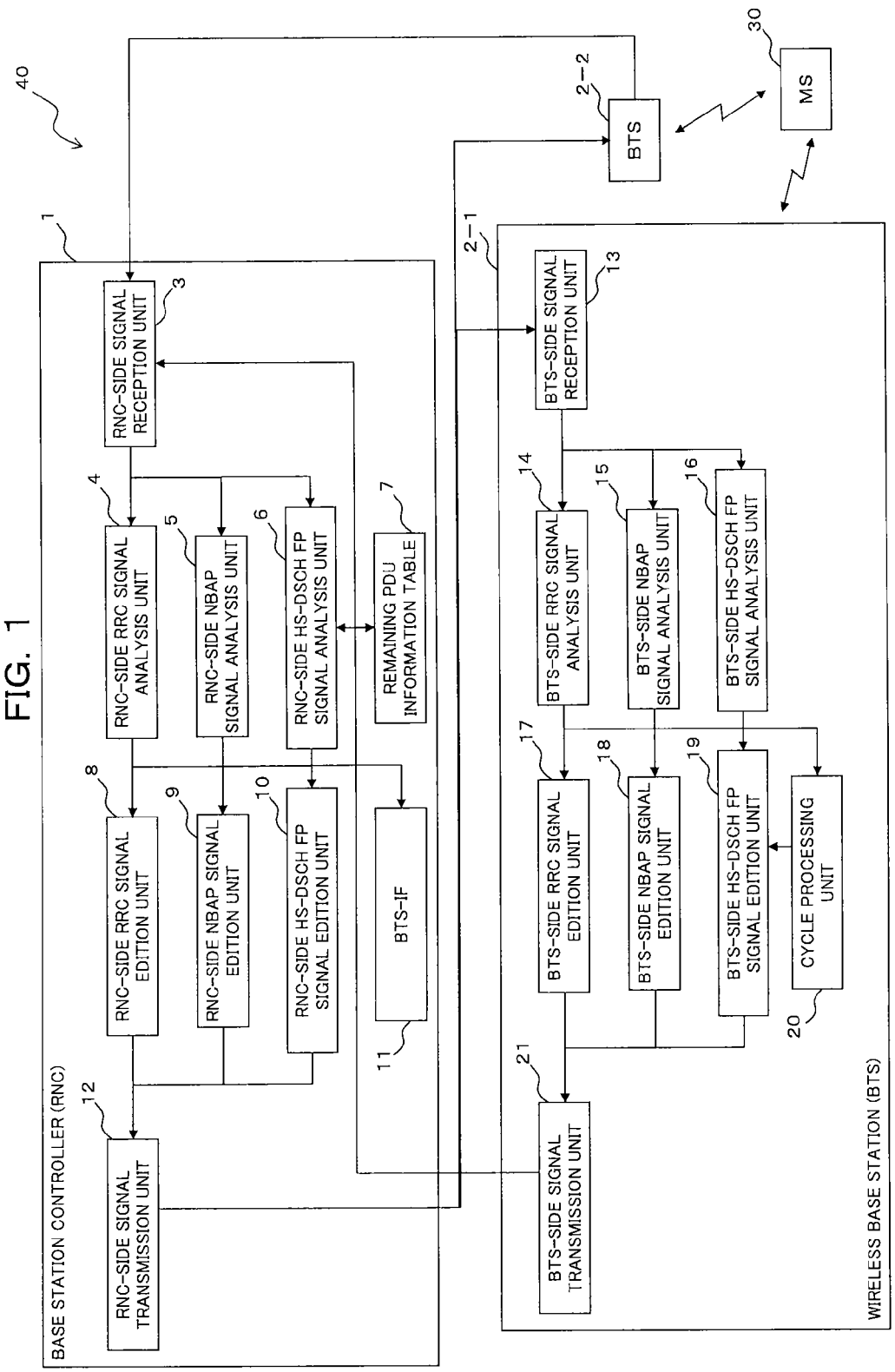
FIG. 1 is a diagram illustrating the configuration of the main portion of a controller and a wireless base station in a wireless communication system according to one embodiment.

FIG. 1 is a diagram illustrating the configuration of the main portion of a controller (radio network controller) and a wireless base station in a wireless communication system according to one embodiment. The wireless communication system 40 depicted in FIG. 1 includes a radio network controller (RNC) 1, a plurality of wireless base stations (BTSs) 2-n (n is an integer equal to or greater than 2, and FIG. 1 illustrates an example where n=2), and at least one wireless terminal (MS) 30 (one in the example in FIG. 1), allowing communications among the RNC 1, the BTSs 2, and the MS 30. It is noted that the BTSs 2-n may be simply referred to as "the BTS 2" when distinction among the BTSs 2-n is not required.

(Example of Configuration of RNC 1)

The RNC 1 is a controller carrying out various types of controls as a higher-level apparatus of the BTSs 2, and includes a function to switch a path used for communicating with the MS 30 from a first path via the BTS 2-1 and a second path via the BTS 2-2 at a predetermined timing. For this purpose, the RNC 1 is configured to include an RNC-side signal reception unit 3, an RNC-side RRC signal analysis unit 4, an RNC-side NBAP signal analysis unit 5, an RNC-side HS-DSCH FP signal analysis unit 6, a remaining PDU information table 7, an RNC-side RRC signal editing unit 8, an RNC-side NBAP signal editing unit 9, an RNC-side HS-DSCH FP signal editing unit 10, a BTS-IF 11, and RNC-side signal transmission unit 12.

Here, the RNC-side signal reception unit 3 is adapted to receive a wireless signal from the MS 30 transferred from the BTSs 2 that has received the signal from the MS 30 and perform processing for providing each processing unit. The RNC-side signal reception unit 3 includes an interface with the signal analysis units for various protocols used in communication with the MS (the RNC-side RRC signal analysis unit 4, the RNC-side NBAP signal analysis unit 5, and the RNC-side HS-DSCH FP signal analysis unit 6), for example, identifies the protocol type of the signals received from the BTSs 2, and sends the received signals to each of the signal analysis units corresponding to each protocol.

The RNC-side RRC signal analysis unit 4 is adapted to analyze a radio resource control (RRC) signal that is sent from the MS 30 via the BTS 2. The RNC-side RRC signal analysis unit 4 includes a function to determine to control either the BTSs 2 or the MS 30, according to an analysis result of an RRC signal from the MS 30, in other words, giving the initiative to the MS 30.

Here, when determining to perform control on the BTSs 2 based on the above RRC signal, the RNC-side RRC signal analysis unit 4 instructs the RNC-side NBAP signal editing unit 9 or the RNC-side HS-DSCH FP signal editing unit 10 to edit a control message accordingly. On the other hand, when determining to perform control on the MS 30, the RNC-side RRC signal analysis unit 4 instructs the RNC-side RRC signal editing unit 8 to edit a control message accordingly.

For example, when the RNC-side RRC signal analysis unit 4 receives the wireless communication quality through the RRC signal, the RNC-side RRC signal analysis unit 4 determines whether or not to perform a control to switch between the cells of the BTSs 2 with which the MS 30 communicates (that is, control on the BTSs 2). In other words, the RNC 1 includes a function to determine whether or not to perform cell (path) switching control (cell change) based on the wireless communication quality in order to improve the communication quality between the MS 30 and a BTS 2.

At this time, since the BTS 2-1 that is the cell change origin and the BTS 2-2 that is cell change destination require reconfiguration of communication links to the MS 30, the RNC-side RRC signal analysis unit 4 instructs the RNC-side NBAP signal editing unit 9 to edit an RL reconfiguration preparation message (RL RECONF. PREPARE) and an establishment request message (ESTABLISH REQUEST) for instructing reconfiguration of the communication links with the MS 30 such that an appropriate control message is sent to the BTS 2-1 and 2-2.

Once reconfiguration which is the communication links between the MS 30 and the BTSs 2-1 and 2-2 is completed, the RNC-side RRC signal analysis unit 4 instructs the RNC-side RRC signal editing unit 8 to edit a physical channel reconfiguration message (PHY. CH. RECONF) for instructing the MS 30 to switch the transport channels. When the RNC 1 receives, from the MS 30, a physical channel reconfiguration complete message (PHY. CH. RECONF. COMPLETE) indicating that the transport channel switching processing has completed, the RNC-side RRC signal analysis unit 4 is adapted to instruct the RNC-side NBAP signal editing unit 9 to edit a release request message (RELEASE REQUEST) for releasing the communication link between the MS 30 and the cell change origin BTS 2-1 such that the communication with the cell change origin BTS 2-1 is released (terminated).

The RNC-side NBAP signal analysis unit 5 is adapted to analyze an NBAP (Node B Application Protocol) signal that is a wireless base station control protocol sent from the BTSs 2. The RNC-side NBAP signal analysis unit 5 includes a function to determine to perform control on either the BTSs 2 or the MS 30 according to the analysis result on NBAP signal received from the BTSs 2. In other words, the RNC-side NBAP signal analysis unit 5 includes a function to perform control on either the BTSs 2 or the MS 30, even when the BTSs 2 has the initiative.

Here, when determining to perform control on the BTSs 2, the RNC-side NBAP signal analysis unit 5 instructs the RNC-side NBAP signal editing unit 9 or the RNC-side HS-DSCH FP signal editing unit 10 to edit a control message accordingly. On the other hand, when determining to perform control on the MS 30, the RNC-side NBAP signal analysis unit 5 instructs the RNC-side RRC signal editing unit 8 to edit a control message accordingly.

For example, the RNC-side NBAP signal analysis unit 5 can receive the wireless communication quality measured by the BTSs 2 through the above NBAP signal, in such a case, the RNC-side NBAP signal analysis unit 5 is adapted to determine whether or not to switch cells of the BTSs 2 with which the MS 30 communicates based on the wireless communication quality measured by the BTSs 2.

Furthermore, when determining that the RNC 1 is to perform cell switching control, the RNC-side NBAP signal analysis unit 5 also includes a function to instruct path switching to the BTS-IF 11 such that paths are switched from the path between the RNC 1 and the cell change origin BTS 2-1 to the path between the RNC 1 and the cell change destination BTS 2-2.

That is, the RNC-side RRC signal analysis unit 4 and the RNC-side NBAP signal analysis unit 5 includes a function to determine to perform path switching control to another BTS 2 for the MS 30 based on the communication quality information from the MS 30 or from the BTSs 2.

The BTS-IF 11 is an interface for terminating communications between the RNC 1 and each of the BTSs 2.

The RNC-side HS-DSCH FP signal analysis unit 6 is adapted to analyze an HS-DSCH FP signal (for example, capacity allocation signal) sent from the BTSs 2, and instruct the RNC-side HS-DSCH FP signal editing unit 10 to edit a control message based on the HS-DSCH FP signal for carrying out the processing.

In this embodiment, the BTSs 2 can specify the transmission rate between the RNC 1 and the BTS 2 using the HS-DSCH FP signal, and notify flow control supplemental information for notifying the RNC 1 of the amount of user data to the MS 30 that remains within the BTS 2 (the number of remaining protocol data units (PDUs)). It is noted that the number of remaining PDUs is stored in a spare extension field in the HS-DSCH FP signal, for example.

By setting a predetermined flag value (for example, 0 or 1) into the spare bit in the HS-DSCH FP signal on the BTS 2 side, the RNC-side HS-DSCH FP signal analysis unit 6 can determine whether or not the HS-DSCH FP signal is flow control supplemental information. For example, the HS-DSCH FP signal is flow control supplemental information if the flag is set to "1 (ON),", and the HS-DSCH FP signal is flow control information if the flag is set to "0 (OFF)."

When analyzing the HS-DSCH FP signal and detecting that the flag value is set to "0," the RNC-side HS-DSCH FP signal analysis unit 6 controls the RNC-side HS-DSCH FP signal editing unit 10 to perform transmission rate control (flow control) between the RNC 1 and the BTS 2.

On the other hand, when detecting that the flag value is set to "1," the RNC-side HS-DSCH FP signal analysis unit 6 obtains the number of remaining PDUs stored in the spare extension field in the HS-DSCH FP signal, and saves (records) the number of remaining PDUs M (M is a natural number) and information on receiving timing of the HS-DSCH FP signal or the like into the remaining PDU information table 7, for each communication call (instance ID (N)) (N is a natural number) between the RNC 1 and the BTS 2. It is noted that, in this example, since the RNC 1 is adapted to periodically receive a report (HS-DSCH FP signal having a flag set to "1") on the number of remaining PDUs from the BTS 2-1, the RNC 1 can easily calculate and monitor a variation in the number of remaining PDUs (for example, the reduction rate of the number of remaining PDUs) per unit time.

The RNC-side HS-DSCH FP signal analysis unit 6 also includes a function to calculate the reduction rate of the number of remaining PDUs (L) within the BTS 2 based on the number of remaining PDUs recorded in the remaining PDU information table 7.

In addition, the RNC-side HS-DSCH FP signal analysis unit 6 determines whether or not the number of remaining PDUs within the BTS 2 is equal to or smaller than a first threshold and determines whether or not the reduction rate of the number of remaining PDUs is equal to or smaller than a second threshold, based on the number of remaining PDUs recorded in the remaining PDU information table 7. When it is determined that one of the conditions is satisfied (one of the determinations may be made), the RNC 1 provides the BTS 2-1 with a data transmission start instruction (release request message (RELEASE REQUEST)) to the MS 30 when changing to the path via the BTS 2-2, and the BTS 2-1 suspends data transmission to the MS 30 in response to data transmission start instruction.

On the other hand, when the path switching control is completed, the RNC 1 provides the BTS 2-2 with a data transmission start instruction (capacity request signal) to the MS 30, and the BTS 2-2 starts data transmission to the MS 30 in response to the data transmission start instruction.

It is noted that setting the first threshold to 0 may indicate that cell (path) switching is to be performed immediately after data, in the BTS 2, to be sent to the MS 30 is consumed, for example, although the first threshold may be set by the user to any appropriate values. Of course, a non-zero predetermined value may be set to the first threshold. In addition, it is possible to perform cell (path) switching according to how much the transmission rate specified by the capacity allocation signal is attained by setting the second threshold to "$\alpha \times$transmission rate $(0<\alpha<1)$," for example, although the second threshold may be set by the user to any appropriate values.

That is, the RNC-side HS-DSCH FP signal analysis unit 6 functions as a monitor unit that monitors the remaining amount of data addressed to the MS 30 (the number of remaining PDUs), and controls the timing to change the path via the BST 2-2 according to the monitor result. For example, the RNC-side HS-DSCH FP signal analysis unit 6 is adapted to function as a control unit that performs change of the path at the timing based on the activation time when above condition is satisfied, and performs control at the timing earlier to the timing based on the activation time (controls such that at the timing earlier to a predetermined timing based on the activation time) when above condition is satisfied. It is noted that the first and second thresholds may be calculated from the operational information on the wireless communication system 40 (for example, the wireless bandwidth employed, the transmission rate immediately before cell switching control is performed), other than the examples described above.

The remaining PDU information table 7 is for recording the number of remaining PDUs for each MS 30, and is configured from a shared or dedicated memory provided in the RNC 1. It is noted that instance IDs are information for identifying each MS 30.

More specifically, as depicted in FIG. 2, one instance ID (N) is related to one number of remaining PDUs (M) and is stored in a one-to-one manner. FIG. 2 illustrates an example of the structure of a remaining PDU information table 7. In other words, the RNC-side HS-DSCH FP signal analysis unit 6 monitors (managements) the number of remaining PDUs for each the MS 30 using the remaining PDU information table 7.

Here, the RNC-side RRC signal editing unit 8 is adapted to edit an RRC signal. For example, the RNC-side RRC signal editing unit 8 edits an RRC signal based on an instruction from the RNC-side RRC signal analysis unit 4, the RNC-side NBAP signal analysis unit 5, or the RNC-side HS-DSCH FP signal analysis unit 6 in response to the received instruction for editing a control message.

The RNC-side NBAP signal editing unit 9 is adapted to edit a NBAP signal. For example, the RNC-side NBAP signal editing unit 9 edits a NBAP signal based on an instruction from the RNC-side RRC signal analysis unit 4, the RNC-side NBAP signal analysis unit 5, or the RNC-side HS-DSCH FP signal analysis unit 6 in response to the received instruction for editing a control message.

The RNC-side HS-DSCH FP signal editing unit 10 is adapted to edit an HS-DSCH FP signal (capacity request signal in this example). For example, the RNC-side HS-DSCH FP signal editing unit 10 edits an HS-DSCH FP signal based on an instruction from the RNC-side RRC signal analysis unit 4, the RNC-side NBAP signal analysis unit 5, or the RNC-side HS-DSCH FP signal analysis unit 6 in response to the received instruction for editing a control message.

The RNC-side HS-DSCH FP signal editing unit 10 controls the RNC-side signal transmission unit 12 to send a capacity request signal having the user buffer size set to "0" to the cell change origin BTS 2-1 such that the cell change origin BTS 2-1 suspends downlink data (user data) transmission to the MS 30 after carrying out cell switching processing, for example.

In addition, the RNC-side signal transmission unit 12 is adapted to perform predetermined wireless transmission processing on a transmission signal to the BTSs 2, and sends the wireless signal. The RNC-side signal transmission unit 12 includes a function to send a predetermined signal to the BTS 2 in response to receiving a transmission request from the RNC-side RRC signal editing unit 8, the RNC-side NBAP signal editing unit 9, or the RNC-side HS-DSCH FP signal editing unit 10, for example.

In the RNC 1 according to one embodiment is constructed as described above, in addition to typical wireless base station control operation, the RNC-side HS-DSCH FP signal analysis unit 6 determines whether or not the number of remaining PDUs within the BTS 2 is equal to or smaller than a first threshold and determines whether or not the reduction rate of the number of remaining PDUs is equal to or smaller than a second threshold, for each communication call between a BTS 2 and the MS 30, based on an HS-DSCH FP signal (capacity allocation signal) received from the BTS 2.

When it is determined that at least one of the above conditions is satisfied, that is, it is determined that "the number of remaining PDUs is equal to or less than the first threshold" or "the reduction rate of the number of remaining PDUs is equal to or less than the second threshold" is satisfied, the RNC 1 performs control on cell switching without waiting for expiration of the timer value set by the activation time.

It is noted that, when there is downlink user data remained in the cell change origin BTS 2-1 after transmission from the cell change origin BTS 2-1 is suspended (after the cell switching control is completed), retransmission processing may be performed between the RNC 1 and the cell change destination BTS 2-2 using an RLC retransmission procedure or the like, or the remaining user data may be transferred from the cell change origin BTS 2-1 to the cell change destination BTS 2-2, thereby transmitting the remaining user data from the cell change destination BTS 2-2.

(Example of Configuration of BTS 2)

On the other hand, a BTS 2 is adapted to be controlled by the RNC 1, as well as carrying out wireless communication with the MS 30. For this purpose, as depicted in FIG. 1, the BTS 2 is configured to include a BTS-side signal reception unit 13, a BTS-side RRC signal analysis unit 14, a BTS-side NBAP signal analysis unit 15, a BTS-side HS-DSCH FP signal analysis unit 16, a BTS-side RRC signal editing unit 17, a BTS-side NBAP signal editing unit 18, a BTS-side HS-DSCH FP signal editing unit 19, a cycle processing unit 20, and a BTS-side signal transmission unit 21.

Here, the BTS-side signal reception unit 13 is adapted to receive a signal from the RNC 1 and perform predetermined reception processing. The BTS-side signal reception unit 13 includes an interface with the signal analysis units for various protocols (the BTS-side RRC signal analysis unit 14, the BTS-side NBAP signal analysis unit 15, and the BTS-side HS-DSCH FP signal analysis unit 16), for example, includes a function to identify the protocol type of the received signal from the RNC 1, and send the received signal to a signal analysis unit corresponding to the protocol.

The BTS-side RRC signal analysis unit 14 is adapted to analyze an RRC signal instructed from the BTS-side signal reception unit 13, and includes a function to instruct the BTS-side RRC signal editing unit 17 to edit a control message accordingly such that the RRC signal is relayed between the RNC 1 and the MS 30.

If the RRC signal received from the RNC 1 during the cell switching control is "physical channel reconfiguration message (Physical Channel Reconfiguration)" that is a signal instructing switching of the transport channel of the MS 30, for example, the BTS-side RRC signal analysis unit 14 also includes a function to instruct the BTS-side HS-DSCH FP signal editing unit 19 to edit the control message such that the downlink user data that is being sent from the RNC 1 to the MS 30 is suspended, and to instruct the cycle processing unit 20 to "cycle processing start" in order to notify the RNC 1 of information on PDUs remained within the BTS 2 (for example, the number of remaining PDUs) at a predetermined cycle.

The BTS-side HS-DSCH FP signal analysis unit 16 is adapted to analyze the HS-DSCH FP signal sent from the BTS-side signal reception unit 13, and, includes a function to, in response to the received downlink user data transmission request (capacity request signal (user buffer size>0)), send a control message to the BTS-side HS-DSCH FP signal editing unit 19 instructing it to edit the control signal to notify the RNC 1 of the transmission allowable rate (transmission rate) in accordance with the communication state with the MS 30 while instructing "cycle processing suspend" to the cycle processing unit 20.

Here, the cycle processing unit 20 is adapted to start and suspend cycle processing based on control signals from the BTS-side RRC signal analysis unit 14 and from the BTS-side HS-DSCH FP signal analysis unit 16. Here, the term "cycle processing" refers to processing for calculating user data (the number of remaining PDUs) to be sent to the MS 30 that is present within the BTS 2 at a predetermined cycle, and notify the RNC 1 of the result.

The cycle processing is performed when the cycle processing unit 20 instructs the HS-DSCH FP signal editing unit 19 to edit a control message to notify the RNC 1 of the number of remaining PDUs, for example. In addition, the cycle processing unit 20 is started when the "cycle processing start" message from the BTS-side RRC signal analysis unit 14 is received whereas the cycle processing unit 20 is suspended when the "cycle processing suspend" message from the BTS-side HS-DSCH FP signal analysis unit 16 is received. It is noted that the predetermined cycle in this cycle processing may be calculated from operational information of the wireless communication system 40 (for example, the supporting wireless bandwidth, the transmission rate immediately before the cell switching control is performed), but may be set separately by the user.

That is, the cycle processing unit 20 includes a function as a detection unit that detects the number of remaining PDUs addressed to the MS 30 within the BTS 2.

The BTS-side NBAP signal analysis unit 15 is adapted to analyze an NBAP signal notified from the BTS-side signal reception unit 13, is adapted to perform processing at the BTS 2 according to the analysis result. In addition, the BTS-side NBAP signal analysis unit 15 instructs the BTS-side NBAP signal editing unit 18 to edit an control message to notify the RNC 1 of the result of the executing of the processing within the BTS 2.

The BTS-side RRC signal editing unit 17 is adapted to edit an RRC signal. For example, when receiving an instruction from the BTS-side RRC signal analysis unit 14, the BTS-side NBAP signal analysis unit 15, and the BTS-side HS-DSCH FP signal analysis unit 16, the BTS-side RRC signal editing unit 17 performs signal editing of the control message or the like according to the details of the instruction, and requests the BTS-side signal transmission unit 21 to send the edited signal.

The BTS-side NBAP signal editing unit 18 is adapted to edit a NBAP signal. For example, when receiving an instruction from the BTS-side NBAP signal analysis unit 15, the BTS-side NBAP signal editing unit 18 performs signal editing of the control message or the like according to the details of the instruction, and requests the BTS-side signal transmission unit 21 to send the edited signal.

The BTS-side HS-DSCH FP signal editing unit 19 is adapted to edit an HS-DSCH FP signal. For example, when receiving an instruction from the BTS-side RRC signal analysis unit 14, the BTS-side HS-DSCH FP signal analysis unit 16, and the cycle processing unit 20, the BTS-side HS-DSCH FP signal editing unit 19 performs signal editing of the control message or the like according to the details of the instruction, and requests the BTS-side signal transmission unit 21 to send the edited signal.

More specifically, when the BTS 2 receives a transmission suspend instruction of downlink user data from the RNC 1, for example, the BTS-side HS-DSCH FP signal editing unit 19 requests the BTS-side signal transmission unit 21 to send a capacity allocation signal (credit=0 and interval=0) in order to send the capacity allocation signal (credit=0 and interval=0) to the RNC 1. On the other hand, when receiving a transmission rate request from the BTS-side HS-DSCH FP signal analysis unit 16, the BTS-side HS-DSCH FP signal editing unit 19 sets an appropriate value to each parameter of the capacity allocation signals, and makes a signal transmission request to the BTS-side signal transmission unit 21.

In addition, when receiving a transmission request of the number of remaining PDUs from the cycle processing unit 20, the BTS-side HS-DSCH FP signal editing unit 19 stores the number of remaining PDUs in the spare extension field of the capacity allocation signal as flow control supplemental information, and a flag value is set to the spare bit indicating that this capacity allocation signal is flow control supplemental information.

The BTS-side signal transmission unit 21 is adapted to send a signal (data) to the RNC 1. The BTS-side signal transmission unit 21 includes a function to send a predetermined signal to the RNC 1 in response to the received transmission request from the BTS-side RRC signal editing unit 17, the BTS-side NBAP signal editing unit 18, or the BTS-side HS-DSCH FP signal editing unit 19, for example.

That is, the BTS-side HS-DSCH FP signal editing unit 19 and the BTS-side signal transmission unit 21 are adapted to function as a notification unit that notifies the RNC 1 of the number of remaining PDUs detected at the cycle processing unit 20. It is noted that the cell change destination BTS 2-2 may be selected as the transmission destination, and that the BTS-side signal transmission unit 21 may transfer the remaining user data to the cell change destination BTS 2-2. The remaining user data may be transferred via a higher-level apparatus (for example, the RNC 1), or may be directly transferred.

Since the BTS2 according to one embodiment is configured as described previously, in addition to normal wireless base station operation, the cycle processing unit 20 calculates the number of remaining PDUs within the BTS 2, and notifies the RNC 1 of the result at a predetermined cycle.

As described previously, in the wireless communication system 40 including the above-described RNC 1 and BTS 2 according to one embodiment, the BTS 2 notifies the RNC 1 of the number of remaining PDUs within the BTS 2, and when the remaining amount (the number of remaining PDUs) of data sent from the BTS 2 to the MS 30 is equal to or smaller than a first threshold for a communication call between the BTS 2 and the MS 30, or when the reduction rate of the number of remaining PDUs becomes equal to or smaller than a second threshold, the RNC 1 performs cell switching control. Thus, the cell switching control can be performed more flexibly and quickly, and it is possible to improve the efficiency of data communication between a wireless terminal and a wireless base station.

(Example of Entire Operation of Wireless Communication System 40)

Figure 3:
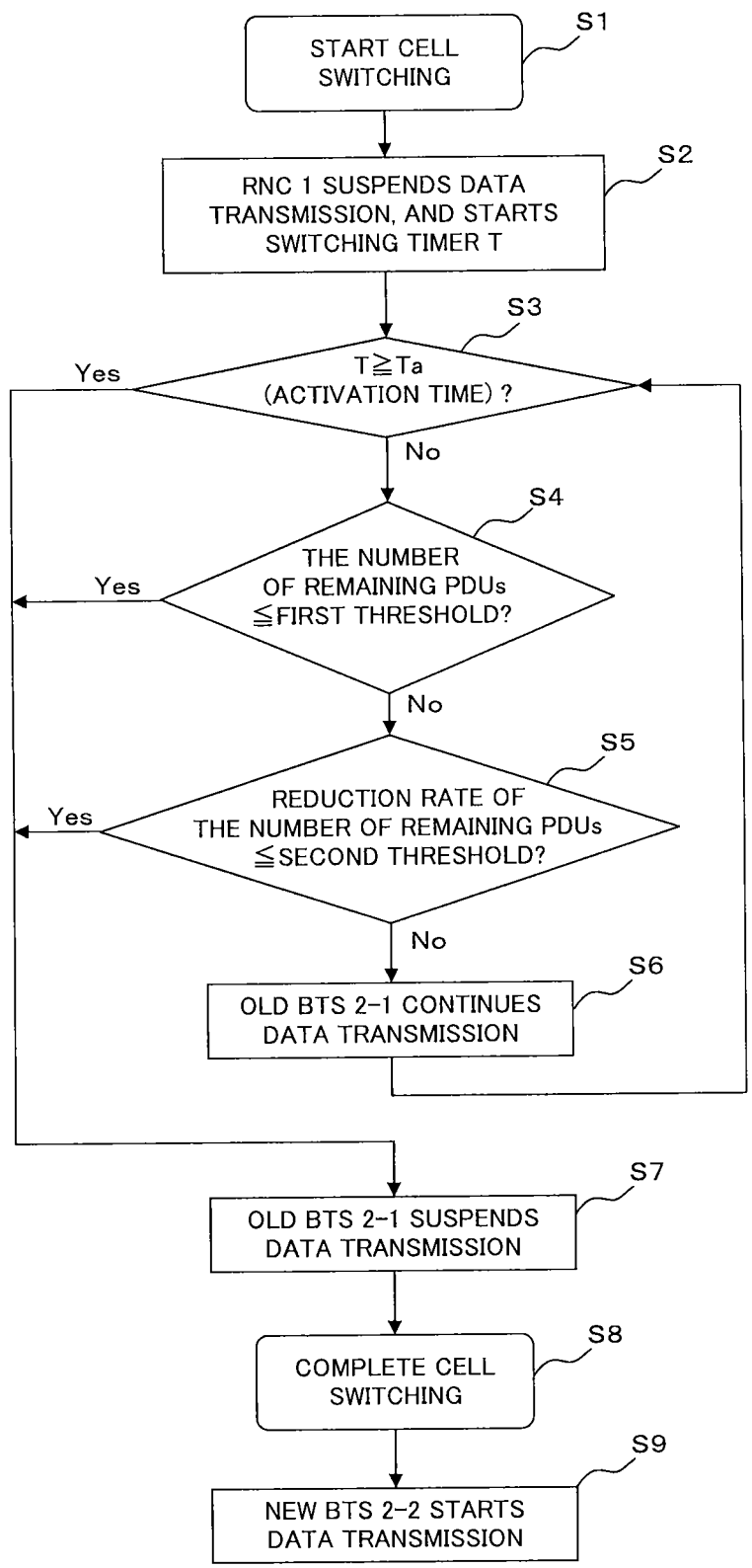
FIG. 3 is a flowchart illustrating one example of the operation of the wireless communication system depicted in FIG. 1.
Figure 4:
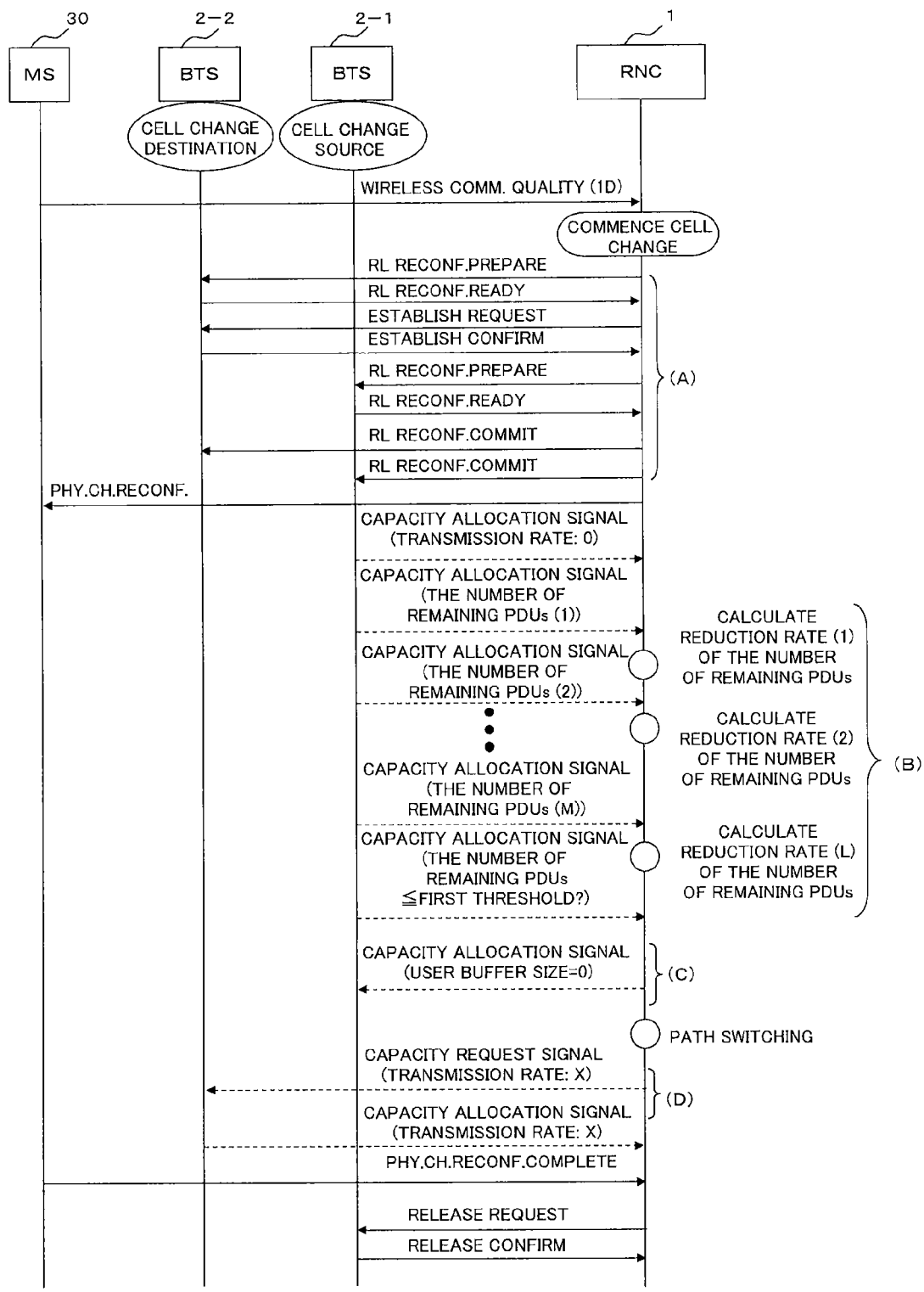
FIG. 4 is a sequence diagram illustrating one example of the operation of the wireless communication system depicted in FIG. 1.
Figure 5:
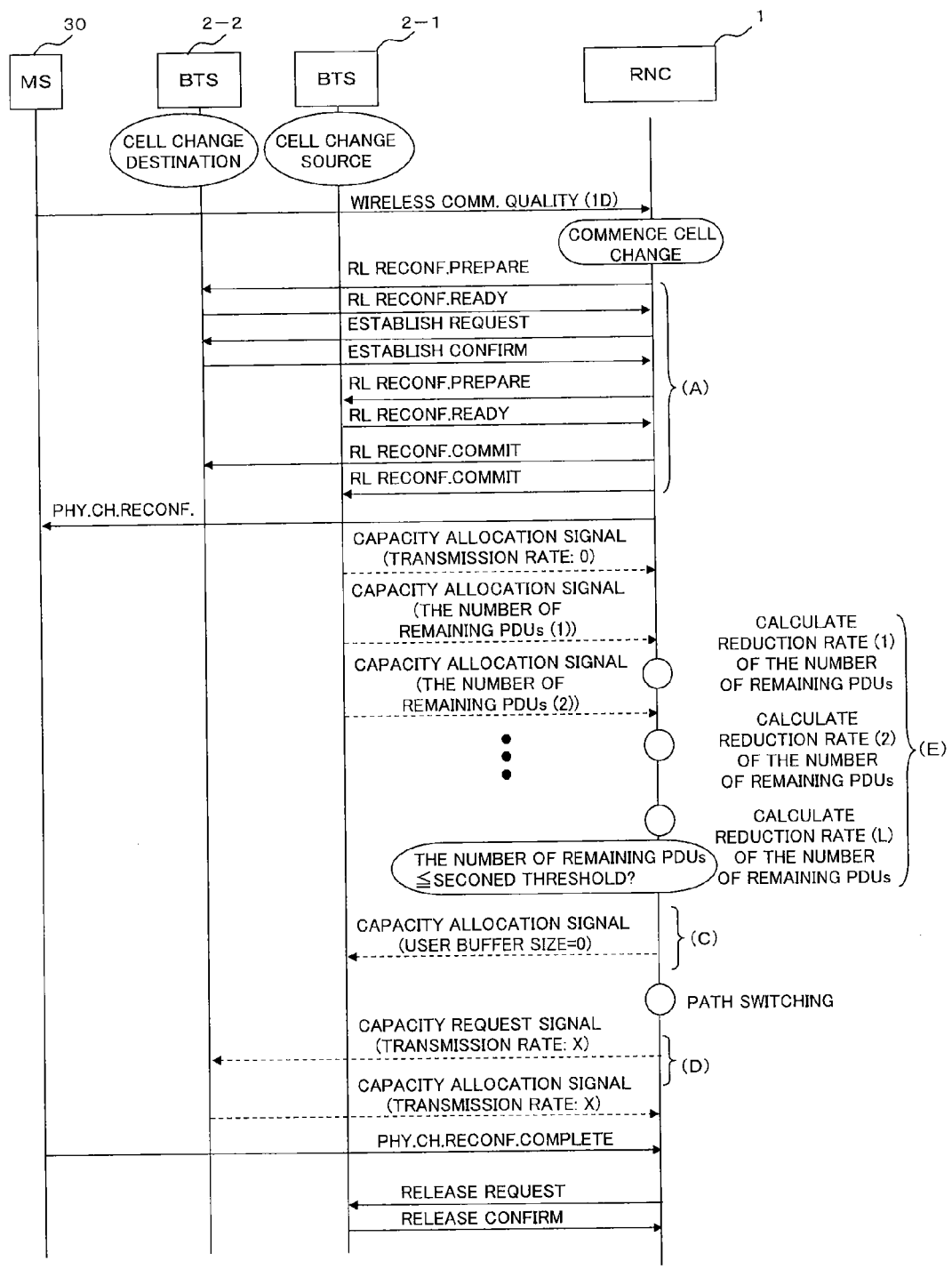
FIG. 5 is a sequence diagram illustrating one example of the operation of the wireless communication system depicted in FIG. 1.
Figure 6:
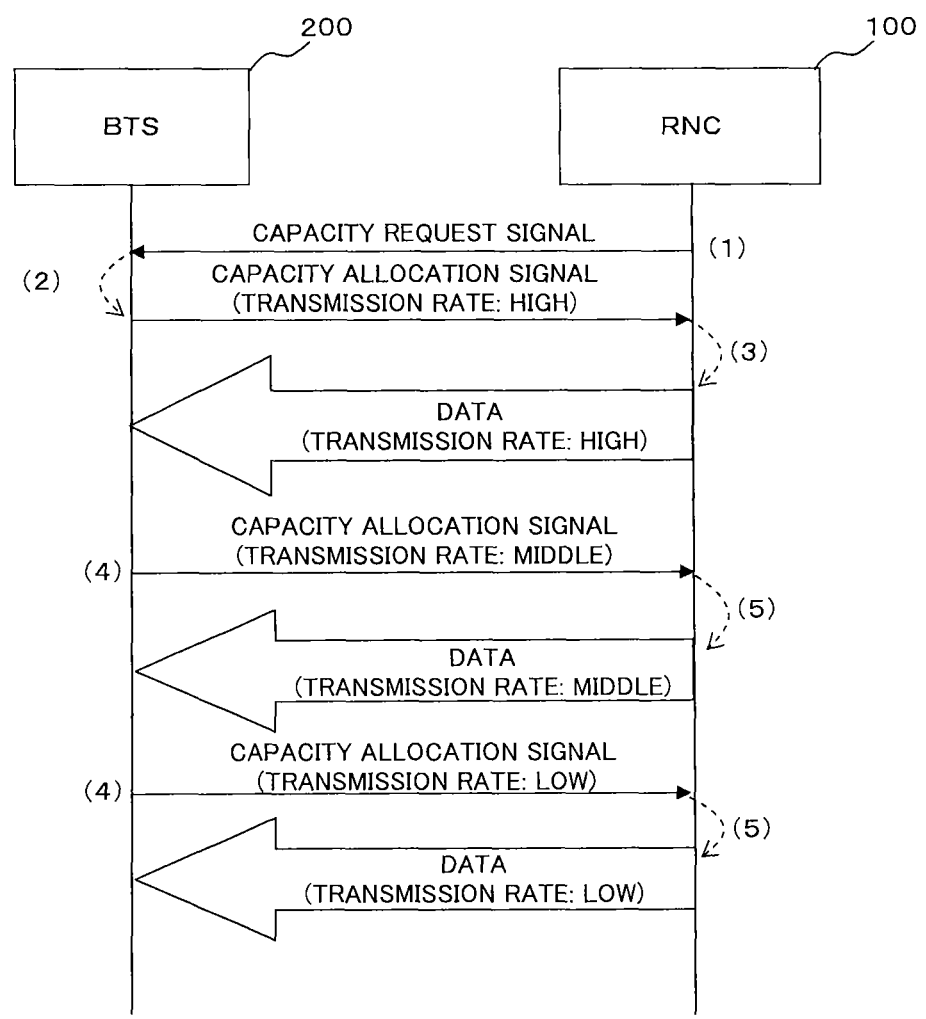
FIG. 6 is a sequence diagram illustrating the communication operation between an RNC and a BTS in a wireless communication system to which the HSDPA is applied.
Figure 11:
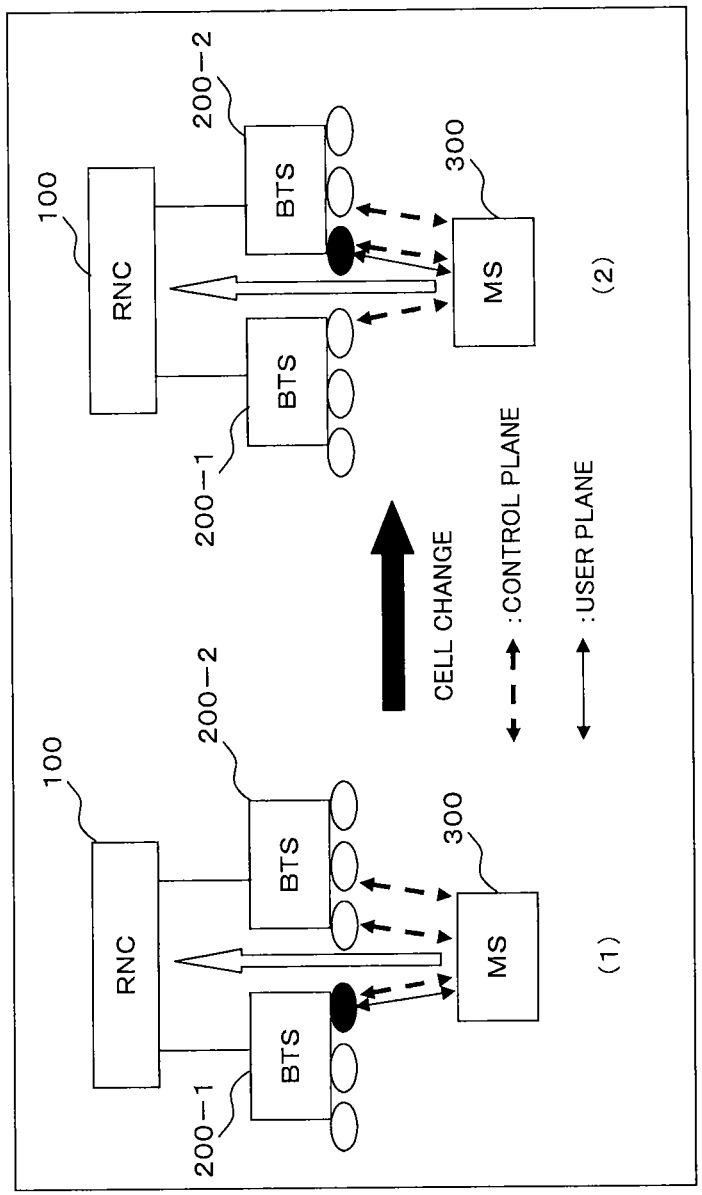
FIG. 11 is a schematic diagram illustrating cell switching control in the wireless communication system.
Figure 12:
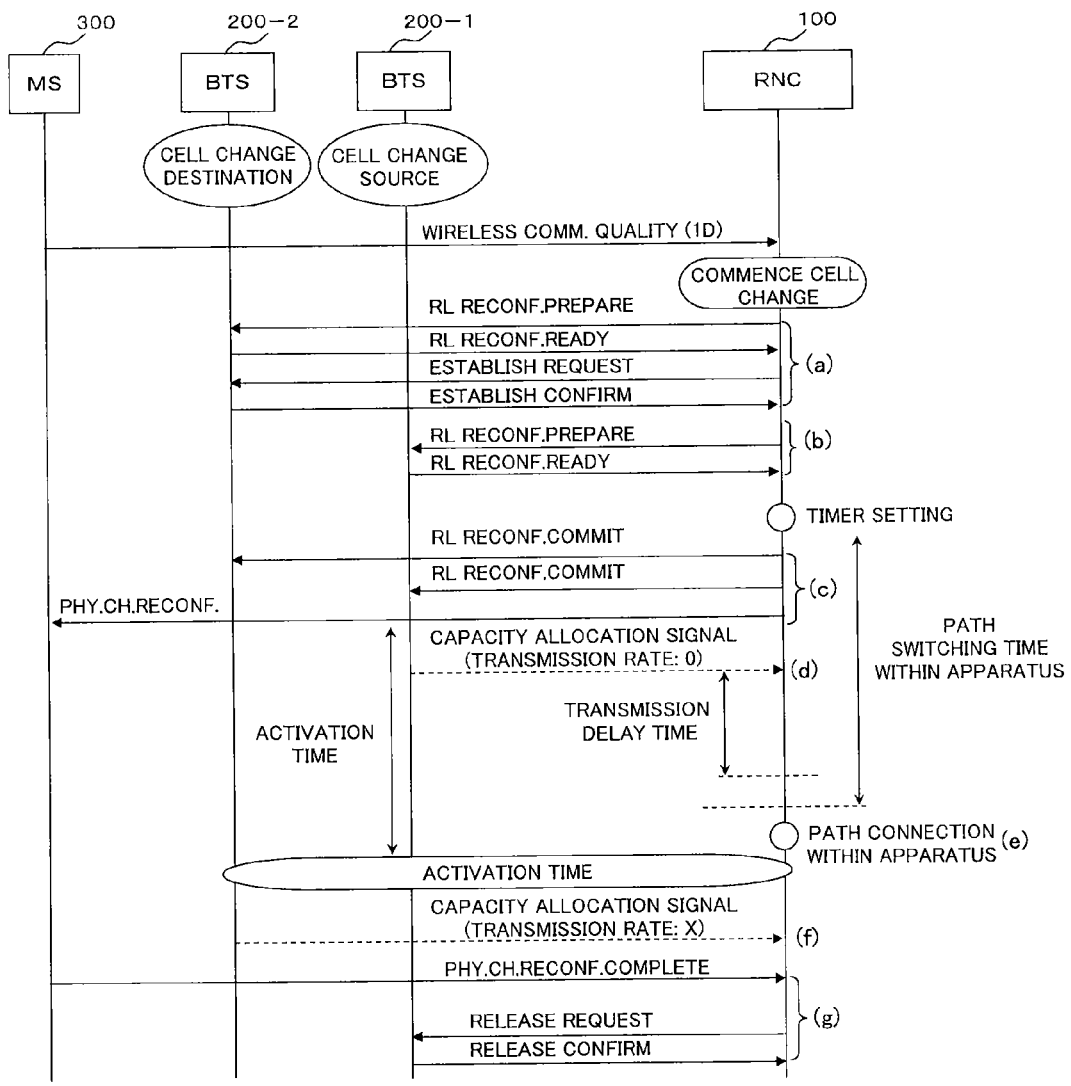
FIG. 12 is a sequence diagram pertaining to the cell switching control depicted in FIG. 11.

Next, the example of the entire operation of the wireless communication system 40 will be described with reference to FIG. 3 to FIG. 5. FIG. 3 is a flow chart illustrating one example of the operation of the wireless communication system 40. In addition, FIG. 4 and FIG. 5 are sequence diagrams illustrating one example of the operation of the wireless communication system 40.

As depicted in FIG. 3, in the wireless communication system 40, when the RNC 1 determines to perform cell switching control, by the RNC-side RRC signal analysis unit 4 or the RNC-side NBAP signal analysis unit 5, based on communication quality information (wireless communication quality) from the MS 30 or the BTS 2 (Step S1), the RNC 1 temporarily suspends the data transmission processing that is being performed by the RNC 1, performs any preparation operation for cell switching control (for example, settings of the RL of the cell change origin BTS 2-1 and the cell change destination BTS 2-2), and starts a switching timer T that is provided to the RNC 1 (this timer is timed out when a predetermined time period elapses) (Step S2).

Next, the RNC 1 compares an activation time Ta with the switching timer T (Step S3). When it is determined that the switching timer T is equal to or greater than the activation time Ta (Yes route in Step S3), the RNC 1 suspends data transmission to the MS 30 at the cell change origin BTS (old BTS) 2-1 by the RNC-side NBAP signal editing unit 9 and the RNC-side signal transmission unit 12 (Step S7), and performs cell switching control (Step S8). The RNC 1 then starts data transmission from cell change destination BTS (new BTS) 2-2 by the RNC-side NBAP signal editing unit 9 and the RNC-side signal transmission unit 12 (Step S9).

On the other hand, when it is determined that the switching timer T is not equal to or greater than the activation time Ta (No route in Step S3), the RNC 1 compares the number of remaining PDUs (M) received from the cycle processing unit 20 of the BTS 2-1 with a predetermined first threshold by the RNC-side HS-DSCH FP signal analysis unit 6 and the remaining packet information table 7 (Step S4). When it is determined that the number of remaining PDUs (M) is equal to or smaller than a first threshold (Yes route in Step S4), the processing in Steps S7-S9 is performed as described above.

On the other hand, in Step S4, when it is determined, by the RNC-side HS-DSCH FP signal analysis unit 6 and the remaining packet information table 7, that the number of remaining PDUs (M) is not equal to or smaller than a first threshold (No route in Step S4), the RNC 1 compares the reduction rate of the number of remaining PDUs that is calculated based on the number of remaining PDUs (M) received from the cycle processing unit 20 of the BTS 2-1 with a predetermined second threshold (Step S5). When it is determined that, by the RNC-side HS-DSCH FP signal analysis unit 6 and the remaining packet information table 7, the reduction rate of the number of remaining PDUs (L) is equal to or smaller than a second threshold (Yes route in Step S5), the processing in Steps S7-S9 is performed as described above.

When it is determined in Step S5, by the RNC-side HS-DSCH FP signal analysis unit 6 and the remaining packet information table 7, that the reduction rate of the number of remaining PDUs (L) is not equal to or smaller than a second threshold (No route in Step S5), that is, when none of the conditions in Steps S3-S5 is satisfied, data transmission to the MS 30 at the old the BTS 2-1 is continued by the RNC-side NBAP signal editing unit 9 and the RNC-side signal transmission unit 12 (Step S6), and the above processing in Steps S3-S5 is repeated.

As described previously, the RNC 1 according to one embodiment monitors the remaining amount data addressed to the MS 30 at the BTS 2, and can perform path switching control according to the monitor result at the path change timing earlier than the predetermined timing (at the timing when the activation time Ta expires). As a result, it is possible to prevent the drop of the communication efficiency of wireless communication.

FIG. 4 is a sequence diagram that focuses on the flow control when the RNC 1 performs cell switching control based on the number of remaining PDUs.

As depicted in FIG. 4, firstly, the MS 30 notifies the RNC 1 of the wireless communication quality (Measurement Report (1D)). The RNC 1 determines to execution of cell switching control initiated by the RNC 1 based on the wireless communication quality ("cell change start"), and performs a predetermined cell switching procedure (see the processing indicated by the reference symbol (A) in FIG. 4). In addition, a physical channel reconfiguration message (PHY. CH. RECONF.) is sent from the RNC 1 to the MS 30.

In the BTS 2-1, the BTS-side signal reception unit 13 notifies the BTS-side RRC signal analysis unit 14 of the signal received from the MS 30. The BTS-side RRC signal analysis unit 14 detects, based on the result of the analysis, that the MS 30 receives a physical channel reconfiguration message (PHY. CH. RECONF.) from the RNC 1, and sends a capacity allocation signal (transmission rate: 0) to the BTS-side HS-DSCH FP signal editing unit 19 so as to suspend transmission of user data from the RNC 1 to the BTS 2-1. Furthermore, the cycle processing unit 20 calculates the number of remaining PDUs within the BTS 2-1 at a predetermined cycle, and sends a capacity allocation signal (the number of remaining PDUs (M)) as flow control supplemental information to the RNC via the BTS-side HS-DSCH FP signal editing unit 19 and the BTS-side signal transmission unit 21.

On the other hand, in the RNC 1, when the capacity allocation signal (transmission rate: 0) is received by the RNC-side signal reception unit 3, transmission of downlink user data from the RNC 1 to the BTS 2-1 is suspended by the RNC-side signal reception unit 3, the RNC-side HS-DSCH FP signal analysis unit 6, and the RNC-side HS-DSCH FP signal editing unit 10. Furthermore, when receiving the capacity allocation signal (the number of remaining PDUs (M)), the RNC 1 extracts the number of remaining PDUs (M) using the RNC-side HS-DSCH FP signal analysis unit 6, and records the number for each instance ID in the remaining PDU information table 7.

The RNC-side HS-DSCH FP signal analysis unit 6 then calculates the reduction rate of the number of remaining PDUs (L) for each instance ID, and determines whether or not the number of remaining PDUs (M) is equal to or less than a predetermined first threshold (for example, 0), and whether or not the reduction rate of the number of remaining PDUs (L) is equal to or less than a predetermined second threshold (for example, the transmission rate specified in the capacity allocation signal multiplied by 0.1) (see the processing indicated by the reference symbol (B) in FIG. 4).

In the example depicted in FIG. 4, the RNC-side HS-DSCH FP signal analysis unit 6 determines that "the number of remaining PDUs (M) is equal to or less than the first threshold" before expiration of the activation time, and sends a capacity allocation signal (user buffer size=0) to the BTS 2-1 via the RNC-side HS-DSCH FP signal editing unit 10 and the RNC-side signal transmission unit 12 so as to suspend transmission of user data from the BTS 2-1 to the MS 30 (see the processing indicated by the reference symbol (C) in FIG. 4). Furthermore, the RNC 1 performs path switching between the BTS 2-1 and the BTS 2-2 using the BTS-IF 11.

In the BTS 2-1, when the capacity allocation signal (user buffer size=0) is received by the BTS-side signal reception unit 13, data transmission from the BTS 2-1 to the MS 30 is suspended by the BTS-side HS-DSCH FP signal analysis unit 16 and cycle processing by the cycle processing unit 20 is also suspended.

Next, the RNC 1 sends a capacity request signal (transmission rate: X>0) by the RNC-side HS-DSCH FP signal editing unit 10 and the RNC-side signal transmission unit 12 in order to commence communication with the BTS 2-2 that is the cell change destination (see the processing indicated by the reference symbol (D) in FIG. 4).

In the BTS 2-2, when the capacity request signal (transmission rate: X>0) is received by the BTS-side signal reception unit 13, for example, a capacity allocation signal (transmission rate: X>0) is sent to the RNC 1 by the BTS-side HS-DSCH FP signal analysis unit 16 and the BTS-side HS-DSCH FP signal editing unit 19.

In addition, in the MS 30, change of the transport channel accompanied by the above cell switching processing is performed to commence new communication with the BTS 2-2 after the cell switching processing. In addition, the MS 30 sends a physical channel reconfiguration complete message (PHY. CH. RECONF. COMPLETE) to the RNC 1 to notify completion of the change processing.

When receiving the physical channel reconfiguration complete message (PHY. CH. RECONF. COMPLETE) from the MS 30, the RNC 1 exchanges a release request message (RELEASE. REQUEST) and a release confirm message (RELEASE. CONFIRM) with the BTS 2-1 to release the wireless link between the BTS 2-1 that is the cell change origin and the MS 30, to complete a series of cell switching control.

As described above, the RNC 1, according to the flow control depicted in FIG. 4, monitors the number of remaining PDUs addressed to the MS 30 (M) at the BTS 2, and can perform cell switching control when determining that the number of remaining PDUs (M) sent from the BTS 2-1 to the MS 30 is equal to or less than the first threshold, without waiting for expiration of the activation time. As a result, it is possible to perform path switching control earlier, thereby preventing any occurrence of no communication time between the MS 30 and the BTS 2-1.

In contrast, FIG. 5 is a sequence diagram that focuses on the flow control when the RNC 1 performs cell switching control based on the reduction rate of the number of remaining PDUs.

The flow control in the example depicted in FIG. 5 is similar to that in the example depicted in FIG. 4, except that the processing indicated by the reference symbol (E) is performed in FIG. 5 in place of the processing indicated by the reference symbol (B) in FIG. 4.

In other words, the RNC-side HS-DSCH FP signal analysis unit 6 then calculates the reduction rate of the number of remaining PDUs (L) for each instance ID, and determines whether or not the number of remaining PDUs (M) is equal to or less than a predetermined first threshold (for example, 0), and whether or not the reduction rate of the number of remaining PDUs (L) is equal to or less than a predetermined second threshold (for example, the transmission rate specified in the capacity allocation signal multiplied by 0.1) (see the processing indicated by the reference symbol (E) in FIG. 4).

Also in the example depicted in FIG. 5, the RNC-side HS-DSCH FP signal analysis unit 6 determines that "the reduction rate of the number of remaining PDUs (L) is equal to or less than the second threshold" before expiration of the activation time, and performs cell switching control.

As described above, the RNC 1, according to the flow control depicted in FIG. 5, monitors the reduction rate of the number of remaining PDUs addressed to the MS 30 (M) at the BTS 2, and can perform cell switching control when determining that the reduction rate of the number of remaining PDUs (L) sent from the BTS 2-1 to the MS 30 is equal to or less than the second threshold, without waiting for expiration of the activation time. As a result, it is possible to perform path switching control earlier, thereby reducing any occurrence of the transmission delay between the MS 30 and the BTS 2-1.

(B) Others

Although embodiments and variations have been described in detail, the present invention is not limited to the embodiment and variations described above and may be modified without departing from the spirit of the embodiments.

For example, in the above embodiment, although the RNC 1 determines whether or not the number of remaining PDUs (M) is equal to or smaller than a first threshold, and whether or not the reduction rate of the number of remaining PDUs (L) is equal to or smaller than a second threshold, one of the determinations may be made.

In addition, for example, the communication quality measurement between the MS 30 and the BTS 2 may be performed on the BTS 2 side, and the wireless communication quality may be reported from the BTSs 2 to the RNC 1 in this case.

In addition, the BTSs 2-1 and 2-2 and the RNC (radio network controller) 1 may not be necessarily separate apparatuses. That is, fundamental functions or the structure of the RNC (radio network controller) 1 (controller (all or some of elements in reference symbol 1 in FIG. 1)) may be incorporated into the BTSs 2-1 and 2-2.

According to the embodiments described above, at least one of the following effects or advantages can be obtained:

(1) According to the method for controlling path switching in a wireless communication system, since the controller monitors the amount of remaining data to wireless terminal at the wireless base station and controls the timing to change according to the monitor result, it is possible to perform path switching control earlier. As a result, it is possible to prevent the drop of the communication efficiency of wireless communication.

(2) In addition, since an earlier path control can be performed more reliably by carrying out the change of the path when determining that the remaining amount of the data is equal to or smaller than a first threshold, it is possible to prevent any occurrence of no communication time in the wireless communication.

(3) In addition, since an earlier path control can be performed more reliably by carrying out the change of the path when determining that the reduction rate of the remaining amount of the data is equal to or smaller than a first threshold, it is possible to reduce any occurrence of the transmission delay in the wireless communication.

(4) In addition, since the reduction rate of the remaining amount of the data can be easily calculated because the controller periodically receives a report on the remaining amount of the data from the wireless base station, it is possible to simplify the processing.

(5) Furthermore, since the controller monitors the remaining amount of the data for each of for the plurality of wireless terminals, it is possible to perform path changes more efficiently. As a result, it is possible to further improve the communication efficiency of the wireless communication.

(6) In addition, since the controller provides the wireless base station with an instruction for suspending data transmission to the wireless terminal upon carrying out the path change, and the wireless base station suspends data transmission to the wireless terminal in response to the instruction for suspending data transmission, it is possible to reliably perform the path change while preventing any drop of the data.

(7) Furthermore, since the controller provides the wireless base station with a data transmission start instruction to wireless terminal when the path change is completed, and the wireless base station starts data transmission to the wireless terminal in response to the data transmission start instruction, it is possible to furthermore improve the communication efficiency of the wireless communication.

(8) In addition, since the detection unit, in wireless base station, detects the amount of remaining data to the wireless terminal within the wireless base station, and the notification unit notifies the controller with the remaining amount of the data detected by the detection unit, the controller can reliably monitor the remaining amount of the data. As a result, it is possible to reliably perform the path change timing control described above.

As described above, according to the embodiments, since a radio network controller can flexibly and quickly perform cell switching control, before expiration of the activation time, based on information related to the number of PDUs remaining within a wireless base station that is the cell change origin, it is possible to improve the communication efficiency of the entire wireless communication system. Accordingly, the embodiments are considered as highly useful in the technical field of wireless communication, particularly in the field of mobile wireless communication technology having the cell switching controlling feature.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for controlling path switching in a wireless communication system including a wireless terminal; a plurality of wireless base stations that communicate with the wireless terminal; and a controller that changes a path used for communicating with the wireless terminal from a first path via a first wireless base station to a second path via a second wireless base station, the method comprising:
    on the controller,
    monitoring a remaining amount of data addressed to the wireless terminal in the first wireless base station; and
    performing the change to the second path when determining that the monitored remaining amount of the data is equal to or smaller than a first threshold.

2. The method for controlling path switching in a wireless communication system according to claim 1, wherein the change to the second path is performed after a predetermined time period elapses when determining that the monitored remaining amount of the data is larger than the first threshold.

3. The method for controlling path switching in a wireless communication system according to claim 1, wherein the change to the second path is performed, when determining that a reduction rate of the remaining amount of the data is equal to or smaller than a second threshold.

4. The method for controlling path switching in a wireless communication system according to claim 1, wherein the controller performs the monitoring by periodically receiving a report on the remaining amount of the data from the first wireless base station.

5. The method for controlling path switching in a wireless communication system according to claim 1, wherein the controller monitors the remaining amount of the data for each of a plurality of wireless terminals.

6. The method for controlling path switching in a wireless communication system according to claim 1, wherein the controller provides, to the first wireless base station, an instruction for suspending data transmission to the wireless terminal when performing the change to the second path; and
    the first wireless base station suspends data transmission to the wireless terminal in response to the instruction for suspending data transmission.

7. The method for controlling path switching in a wireless communication system according to claim 1, wherein the controller provides, to the second wireless base station, an instruction for starting data transmission to the wireless terminal after the change to the second path is completed; and
    the second wireless base station starts data transmission to the wireless terminal in response to the instruction for starting data transmission.

8. A controller in a wireless communication system including a wireless terminal; a plurality of wireless base stations that communicate with the wireless terminal; and the controller that changes a path used for communicating with the wireless terminal from a first path via a first wireless base station to a second path via a second wireless base station, the controller comprising:
    a monitor that monitors a remaining amount of data addressed to the wireless terminal in the first wireless base station; and
    a controlling unit that performs the change to the second path when determining that the monitored remaining amount of the data is equal to or smaller than a first threshold.

9. The controller in a wireless communication system according to claim 8, wherein the controlling unit performs the change to the second path after a predetermined time period elapses when determining that the monitored remaining amount of the data is equal to or smaller than the first threshold.

10. The controller in a wireless communication system according to claim 8, wherein the controlling unit performs the change to the second path when determining that a reduction rate of the remaining amount of the data is equal to or smaller than a second threshold.

11. The controller in a wireless communication system according to claim 8, wherein the monitor monitors the remaining amount of the data for each of a plurality of wireless terminals.

12. A wireless base station in a wireless communication system including a wireless terminal; a plurality of wireless base stations that communicate with the wireless terminal; and a controller that changes a path used for communicating with the wireless terminal from a first path via a first wireless base station to a second path via a second wireless base station, the wireless base station comprising:
    a detector that detects a remaining amount of data addressed to the wireless terminal within the wireless base station; and
    a notifier that notifies the controller of the remaining amount of the data detected by the detector, wherein the change to the second path is performed when the controller determines that the notified remaining amount of the data is equal to or smaller than a first threshold.

* * * * *